United States Patent [19]

Norris

[11] 4,407,406
[45] Oct. 4, 1983

[54] WALKING BEAM MECHANISM

[75] Inventor: Dallas G. Norris, Indianapolis, Tenn.

[73] Assignee: Western Electric Company, Incorporated, New York, N.Y.

[21] Appl. No.: 314,943

[22] Filed: Oct. 26, 1981

[51] Int. Cl.³ ............................................. B65G 25/00
[52] U.S. Cl. .................................................. 198/774
[58] Field of Search ................................ 198/773, 774

[56] References Cited
U.S. PATENT DOCUMENTS

| 3,086,642 | 4/1963 | Schwartz | 198/774 |
| 4,050,571 | 9/1977 | Kushigan | 198/774 |
| 4,195,213 | 3/1980 | Chiboroski | 198/774 X |

Primary Examiner—Jeffrey V. Nase
Assistant Examiner—Dennis Williamson
Attorney, Agent, or Firm—R. F. Kip, Jr.

[57] ABSTRACT

A walking beam (20) is supported on and fixedly coupled to a pair of vertical rods (39) slidably received in bushings (41) mounted on a horizontally-movable carriage (40) held stationary in the absence of overriding force by a friction brake (60) coupled through a lost motion coupling (46, 48, 66) with a drive member 32 moved by an actuator 31 to undergo in alternation forward and reverse strokes. The rods (39) are pivotally coupled to the drive member (32) by inclined links (36). The arrangement is adapted to convert each forward and subsequent reverse stroke of the drive member into an up-forward-down-return rectangular movement of the beam (20).

4 Claims, 5 Drawing Figures

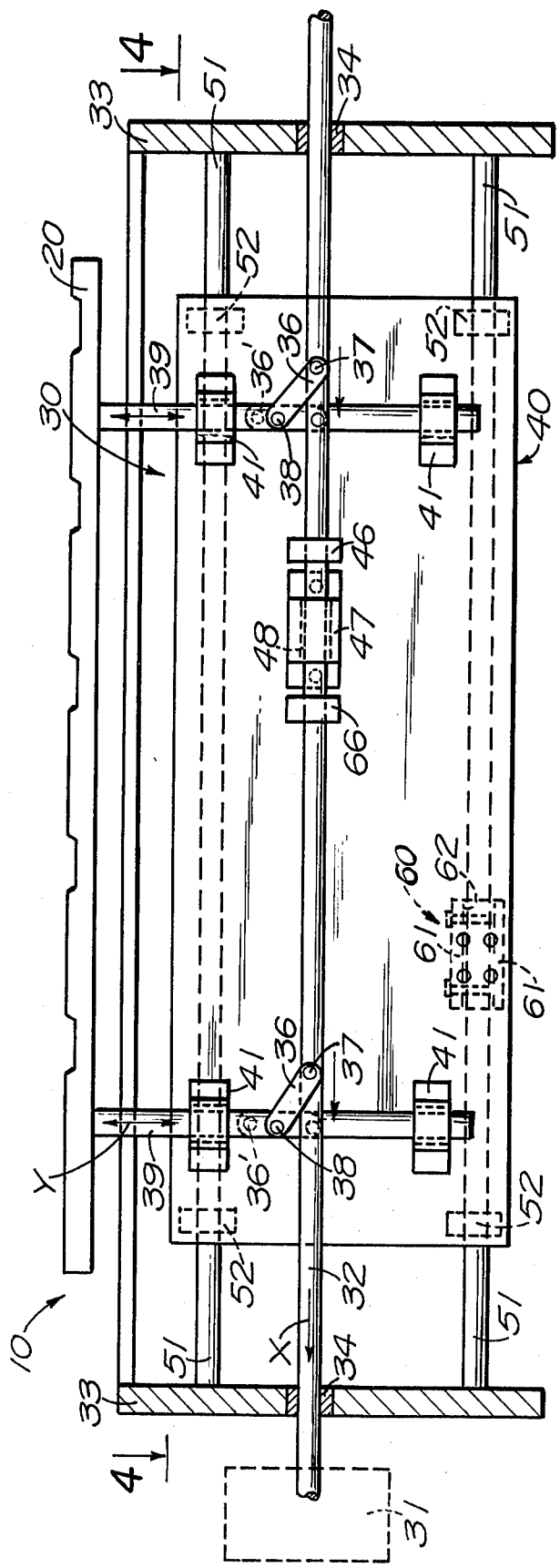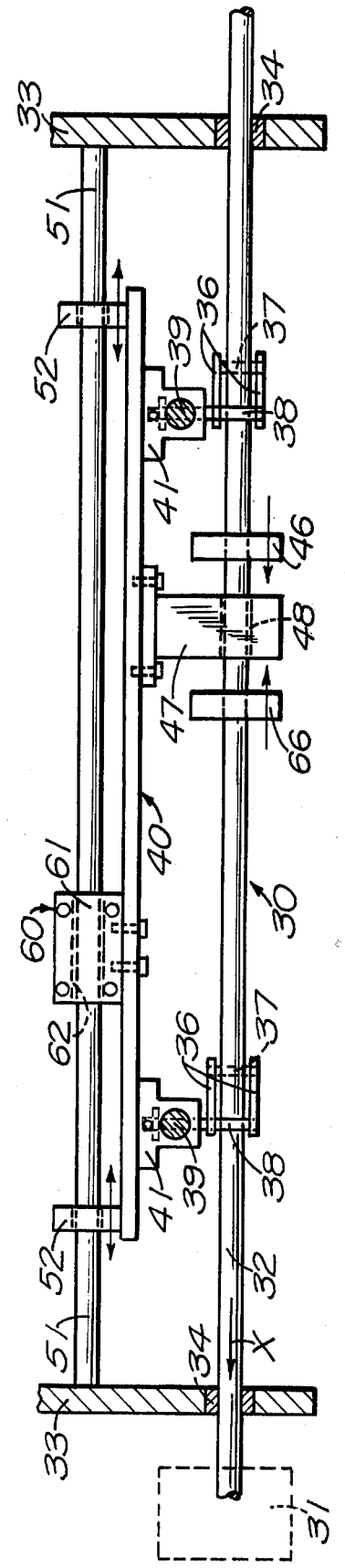

WALKING BEAM MECHANISM

TECHNICAL FIELD

This invention relates generally to apparatus including a walking beam and more particularly to apparatus for imparting to such beam a cyclical motion adapted to produce stepwise movement in a path of articles therein.

BACKGROUND OF THE INVENTION

Proposals heretofore made in the art for walking beam apparatus are as follows.

U.S. Pat. No. 4,050,571, issued Sept. 27, 1977 to A. Kushigan discloses a mechanism in which a walking beam is supported by bell crank levers pivotally connected at their tops to the beam, at their centers to a slide and at their bottoms to a link. Movements of the slide and link cause the beam to undergo cycles of movement in each of which it angularly pivots upward, translationally advances, angularly pivots downward and then translationally retracts.

U.S. Pat. No. 4,209,087 issued June 24, 1980 to A. Kushigan discloses a walking beam actuating mechanism so similar to the mechanism disclosed in U.S. Pat. No. 4,050,571 that the description given above applies to both.

U.S. Pat. No. 3,086,642 issued Apr. 23, 1963 to R. Schwartz discloses apparatus in which the combination of a horizontally movable work carrier assembly and cams on an actuator slide is utilized to impart to a work transfer bar a cyclical up-forward-down-reverse movement.

SUMMARY OF THE INVENTION

In contrast to the foregoing proposals, apparatus according to the invention comprises a frame, a longitudinally reciprocable carriage mounted by the frame, and carriage positioning means including carriage drive means adapted to undergo longitudinal forward and reverse strokes and coupled to the carriage by a lost motion coupling so that, during a first interval of each of such strokes, such carriage and drive means are uncoupled with the former remaining stationary, and, during a second interval of each of such strokes, the two are coupled to move together. The apparatus further includes beam support means mounting such beam from such carriage to be longitudinally movable therewith and laterally movable with respect thereto.

In addition, such apparatus comprises link means coupled between such drive means and support means and pivotally coupled to each thereof. The link means is responsive to changes in the relative positioning of the carriage and drive means during the first interval of, respectively, each forward stroke and subsequent reverse stroke to displace the support means to, respectively, a laterally outward position and a laterally inward position. The combined longitudinal and lateral movements of the carriage and the support means causes the walking beam to undergo a rectangular movement in the course of each such forward stroke and reverse stroke.

BRIEF DESCRIPTION OF THE DRAWINGS

For a better understanding of the invention, reference is made to the following description of a representative embodiment thereof, and to the accompanying drawings wherein:

FIG. 3 is a front elevation of apparatus for actuating the walking beam of FIGS. 1 and 2;

FIG. 4 is a plan view, taken as indicated by the arrows 4—4 in FIG. 3 of the FIG. 3 apparatus.

DETAILED DESCRIPTION

Figure 1:
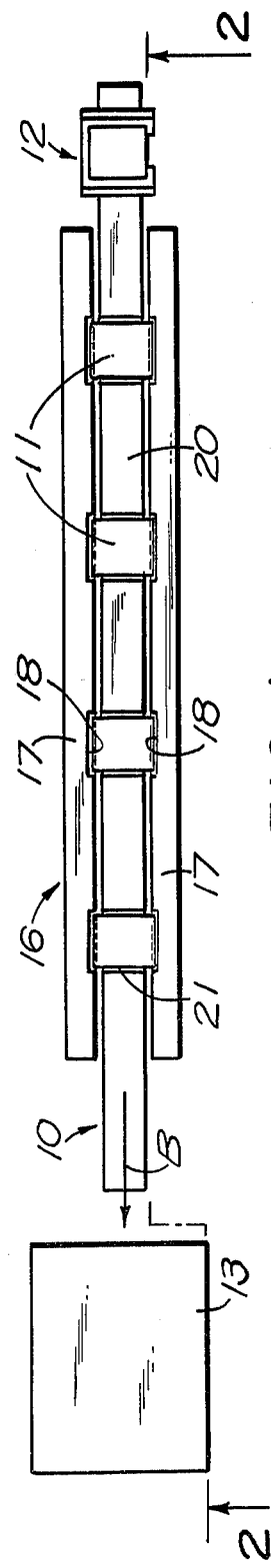
FIG. 1 is a plan view of an equipment layout for transporting articles in a horizontal path by means of interaction between a stationary carrier for such articles and a walking beam which periodically causes such articles to be advanced one step in such path.
Figure 2:
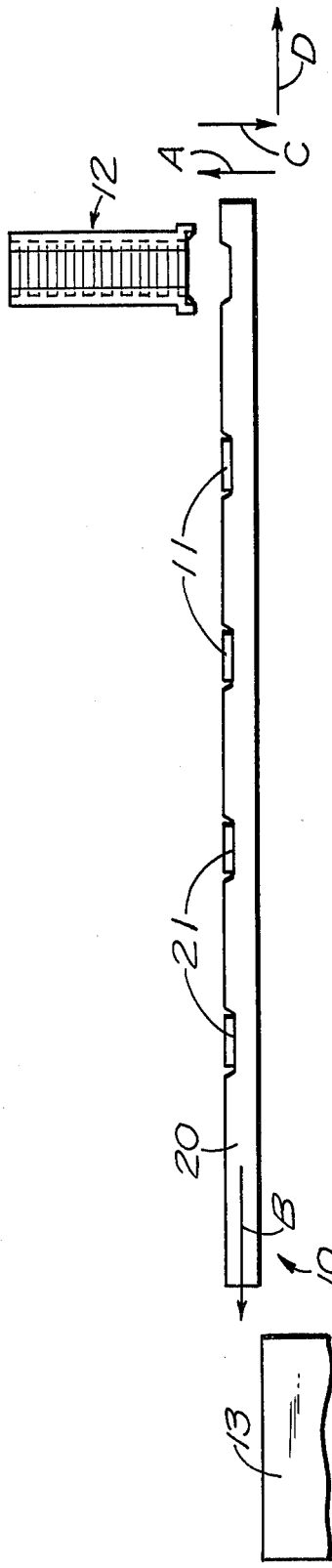
FIG. 2 is a front elevation, taken as indicated by the arrows 2—2 in FIG. 1, of the walking beam of FIG. 1 and of other details shown in FIG. 1.

Referring first to FIGS. 1-2, the shown equipment layout 10 is designed to intermittently advance a number of articles 11—11 in a series of steps to a work station. In the layout illustrated, the articles are in the form of workpieces consisting of thin rectangular thin-film circuits (i.e., hybrid integrated circuits or "HICs") which are to be advanced in a series of steps right to left in FIG. 1 in a horizontal path from a supply magazine 12 at the right to a work station 13 at the left. For this purpose, a fixed carrier 16 is provided consisting of a pair of spaced parallel horizontal rails 17—17 having opposing recesses 18—18 in the upper surfaces thereof, defining a series of equally spaced pockets in which rest a row of the circuits 11 equidistantly spaced from each other and liftably disposed in such pockets.

Figure 5:
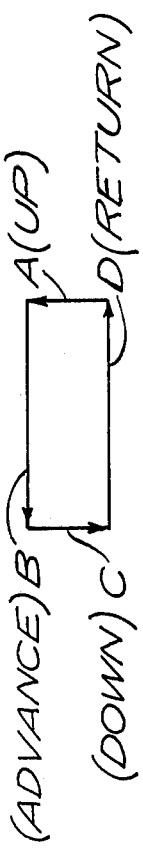
FIG. 5 is a diagram of the movement of the walking beam.

The layout 10 includes a thin horizontal rectangular bar or walking beam 20, which is mounted between the rails 17—17 and has a series of pockets 21—21 formed in the upper surface thereof that are shaped to receive the circuits 11—11 and are spaced along the length of the beam a distance equal to the spacing between pockets 18 of the carrier 16. In operation, the beam 20 is first moved vertically up a preset distance (arrow A in FIG. 5) so that it is inserted between the rails 17—17 to pick up one circuit 11 from the magazine 12 and to lift all circuits in the carrier pockets 18 out of these pockets; then shifted horizontally to the left (arrow B in FIG. 5) the distance between the adjacent pockets 18—18 so as to align each circuit above the next carrier pocket 18 and to align the left most circuit in the beam pocket 21 at the left with a receiving position at the work station 13; then vertically downward (arrow C in FIG. 5) to drop the circuits into the next carrier pockets 18 and at the work station; then shifted back to the right (arrow D in FIG. 5) to the initial position.

FIGS. 3 and 4 show apparatus including walking beam 20 for causing such beam to undergo a rectangular movement A (up), B (left to advance), C (down), and D (return) as described, using a single actuator means 31, which can be either a conventional air cylinder or an eccentric crank mechanism. The actuator 31 is operated to advance the carriage drive means in the form of a main driving member or rod 32 horizontally to the left (arrow X) in a fixed frame 33, the rod 32 being mounted for horizontal reciprocation in fixed bushings 34 mounted at at the ends of the frame 33. As the rod 32 shifts longitudinally to the left, link means in the form of two pairs of pivoted links 36—36 are moved from the angled positions shown in FIG. 3 to vertical positions 36' shown in dotted lines at the left in FIG. 3. For this purpose, the lower ends of each pair of links 36 are mounted by a transverse pivot pin 37 to the drive rod 32 on opposite sides thereof as shown in FIG. 4 so that the links 36 can pivot about the pin 37 as the pin shifts to the left with the rod 32. The upper ends of the respective pairs of links 36 are pivotally coupled by transverse pivot pins 38 to laterally movable beam support means in the form of a pair of horizontally spaced vertically-extending laterally movable rods 39 each corresponding to a respective one of such two pairs of links, and on which the beam 20 is mounted as shown in FIG. 3 by being fixedly coupled to those rods. As shown, each of such pins passes at one end through holes in the upper end of the corresponding links 36 and passes at the other end through a hole in the corresponding rod 39, the pin being rotatable with respect to such rod. If desired, the pair of links 36 corresponding to each of the two rods 39 may be replaced by a single transversely thick link.

The vertical rods 39 are mounted on a carriage 40 by guide means in the form of two pairs of vertically spaced bushings 41—41 fixed to the carriage, each pair of bushings having slidably received therein a respective one of the two rods 39. Each such rod is constrained by its associated bushings to move only vertically. The rods 39 move upward (arrow A) a preset distance determined by the geometry of the links 36—36, as the links straighten from the initial angled positions illustrated to their vertical operated positions.

As the drive rod 32 completes the first interval of its forward stroke to elevate the beam 20 to its workpiece receiving position, a first coupling collar 46 fixed on rod 32 engages the right side of a block 47 fixedly mounted to the carriage 40 so that the carriage 40 is thereafter coupled to the rod 32 for horizontal movement therewith during the remainder or second interval of the forward stroke of the rod. For this purpose, the drive rod 32 is mounted for axial reciprocation in a bushing 48 positioned in a longitudinal bore of the block 47, such mounting providing a lost motion coupling of the rod and carriage so as to permit the initial sliding movement during such first interval of the rod 32 with respect to the block 47 and carriage 40.

The carriage 40 is mounted by the frame 33 for reciprocating horizontal longitudinal movement to the left and right on a pair of fixed longitudinal guide rods 51—51 forming parts of the frame. Carriage 40 has mounted thereon two sets of bushings 52—52 for supporting the carriage 40 on the rods 51. The carriage has fixedly attached thereto a releasable friction brake mechanism 60, which during the first interval holds the carriage 40 stationary. The frictional holding of the carriage by the brake is overcome by the engaging of the collar 46 with the block 47 after the first interval of the stroke, so that the carriage 40 is thereafter pulled along with the rod during the second interval of the forward stroke. In the described embodiment, the brake is a simple friction brake including a pair of spring-loaded blocks 61 mounted on the carriage 40 and having a longitudinal bore 62 for receiving one of the fixed guide rods 51, the bore 62 being faced with frictional material for engaging the rod 51 with sufficient frictional force that the carriage 40 normally does not move with the drive rod 32 until the engagement 46/47 occurs, after which the frictional force is overcome and the carriage thereafter is pulled along by the rod during the second interval of the forward stroke to complete the horizontal movement of the beam 20 (arrow B). As is evident, the drive member 32 and the brake 60 together constitute a carriage positioning means for longitudinally positioning the carriage 40 in relation to the frame 33.

After the forward horizontal movement of the carriage has been completed as described, the actuator 31 reverses direction and the drive rod 32 begins return movement to the right. During the first interval of such reverse stroke, the carriage 40 is again locked by the brake 60 so as to not move with the drive rod 32, and the links 36 pivot back to the FIG. 3 position to lower the beam 20 back to the original level (arrow C) to redeposit the workpieces 11 on the carrier 16 as described above. After this, a second drive collar 66 fixed to the drive rod 32 to the left of the block 47 engages the left side of the block 47, and the carriage 40 and beam 20 are thereafter longitudinally coupled to the rod 32 during the second interval of the reverse stroke for horizontal return movement (arrow D) to the initial position, with the action of the brake 60 being overridden by the force from rod 32 communicated to carriage 40 by the engagement 66/47 between the collar 66 and the carriage block 47. The collar 66 and block 47 provide the lost motion coupling between the carriage 40 and the driving member 32 for purposes of the return movement of the carriage during such second interval.

What is claimed is:

1. Walking beam apparatus comprising, a frame, a longitudinally reciprocable carriage mounted by said frame, carriage positioning means for longitudinally positioning said carriage and including for that purpose carriage drive means adapted to undergo alternate longitudinal forward and reverse strokes and coupled to said carriage by a lost motion coupling, said positioning means being operable such that, during a first interval of each of such strokes, such carriage and drive means are uncoupled while said carriage remains stationary and, during a second interval of each of such strokes, such carriage and drive means are coupled to move longitudinally together, a walking beam, movable beam support means fixedly coupled to said beam and slidably coupled with said carriage so as to render said beam longitudinally movable therewith and laterally movable with respect thereto, guide means on said carriage for constraining lateral movement of such support means and beam to be normal to the longitudinal movement of said carriage, and link means coupled between said drive means and support means and pivotally coupled to each thereof, said link means being responsive to changes in the relative positioning of such carriage and drive means during the first interval of, respectively, each such forward stroke and subsequent reverse stroke to displace said support means to, respectively, a laterally outward position and a laterally inward position, the combined movements of such carriage and support means being adapted to cause said beam to undergo a rectangular movement in the course of each such forward stroke and subsequent reverse stroke.

2. Apparatus for imparting longitudinal step movements in a horizontal path to articles resting on a carrier and liftably disposed thereon in equidistantly spaced relation along said path, said apparatus comprising, a stationary frame disposable beneath said carrier, a carriage mounted by said frame to be reciprocably movable horizontally in a direction parallel to said path, a brake for frictionally holding said carriage stationary absent force applied thereto, a carriage driving member reciprocably movable horizontally in forward and reverse strokes and coupled to said carriage by a lost motion coupling by which, during first and second intervals of each of such strokes, said carriage is, respectively, uncoupled from said member to be frictionally held stationary by said brake and coupled with said member to be caused to move therewith by force therefrom overcoming the frictional holders of said brake, actuator means for moving said member in said forward and reverse strokes, a walking beam disposed above said carriage, a pair of horizontally-spaced vertically-extending rods fixedly coupled at their tops to said beam to support it, rod guiding means on said carriage and within which said rods are slidable up and down so as to be constrained to move vertically between down and up positions at which said beam is, respectively, below and above said carrier, such beam in moving to, respectively, said up position and said down position being adapted, respectively, to lift said articles off said carrier and to redeposit them on said carrier while meanwhile maintaining said equidistantly spaced relation between said articles, and a pair of link means each corresponding to a respective one of said pair of rods and each comprising at least one link coupled at one and the other of its end to, respectively, said drive member and the corresponding rod, such couplings of each such link being horizontally and vertically offset so as to render such link responsive to changes in the horizontal relative positioning of said carriage and driving member occurring in the first interval of each of, respectively, such a forward stroke and the subsequent reverse stroke to displace said beam to said up position and to said down position, respectively, during, respectively, such first interval of such forward stroke and such subsequent first interval of said reverse stroke, the combined horizontal and vertical movements of, respectively, said carriage and beam during each such forward stroke and subsequent reverse stroke being adapted to produce an overall rectangular beam movement by which said articles in each cycle of such overall movement are simultaneously advanced in said path by one step equal in distance to the spacing between adjacent articles.

3. Apparatus according to claim 2 in which each such link means comprises a pair of similar links disposed on opposite transverse sides of said drive member and having their lower ends pivotally coupled thereto, such link means further comprising a transverse pin passing at one end through respective holes in the respective upper ends of such links, the other end of said pin being pivotally coupled to the corresponding rod.

4. Apparatus according to claim 2 or claim 3 in which said rod guiding means comprises two pairs of bushings mounted on said carriage, each such pair of bushings corresponding to a respective one of said rods and being relatively vertically spaced and having such rod slidably received within both thereof so as to constrain such rod to move only vertically.

* * * * *